(12) United States Patent
Sweeten

(10) Patent No.: US 9,413,987 B2
(45) Date of Patent: Aug. 9, 2016

(54) FACET SHAPE AND DISTRIBUTION PATTERN FOR LENSLESS IMAGING

(71) Applicant: QUALCOMM Incorporated, San Diego, CA (US)

(72) Inventor: Jim L. Sweeten, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/210,250

(22) Filed: Mar. 13, 2014

(65) Prior Publication Data

US 2015/0264276 A1 Sep. 17, 2015

(51) Int. Cl.
| | |
|---|---|
| *H04N 5/225* | (2006.01) |
| *H04N 9/09* | (2006.01) |
| *H04N 5/335* | (2011.01) |
| *H04N 5/247* | (2006.01) |
| *H04N 5/30* | (2006.01) |
| *G02B 5/09* | (2006.01) |
| *H04N 5/235* | (2006.01) |
| *G06F 3/042* | (2006.01) |

(52) U.S. Cl.
CPC .. *H04N 5/30* (2013.01); *G02B 5/09* (2013.01); *G06F 3/0421* (2013.01); *H04N 5/2351* (2013.01)

(58) Field of Classification Search
None
See application file for complete search history.

(56) References Cited

U.S. PATENT DOCUMENTS

| 8,274,495 | B2 | 9/2012 | Lee | |
|---|---|---|---|---|
| 2012/0045171 | A1* | 2/2012 | Chen | 385/36 |
| 2012/0098950 | A1 | 4/2012 | Zheng et al. | |
| 2012/0135512 | A1* | 5/2012 | Vasylyev | 435/292.1 |
| 2012/0327288 | A1* | 12/2012 | Gruhlke et al. | 348/340 |
| 2013/0092821 | A1 | 4/2013 | Ozcan et al. | |
| 2013/0278982 | A1 | 10/2013 | Huys et al. | |
| 2013/0280752 | A1 | 10/2013 | Ozcan et al. | |
| 2013/0321432 | A1* | 12/2013 | Burns | 345/501 |

OTHER PUBLICATIONS

International Search Report and Written Opinion—PCT/US2015/018172—ISA/EPO—Jun. 3, 2015.

* cited by examiner

*Primary Examiner* — Lin Ye
*Assistant Examiner* — Euel Cowan
(74) *Attorney, Agent, or Firm* — Blakely Sokoloff Taylor & Zafman, LLP

(57) ABSTRACT

Aspects of the invention are related to a method and apparatus for capturing an image without a lens. Ambient light reflected off of objects are received through a surface of a light guide substrate and reflected off of reflective features included therein toward a plurality of photodetectors arranged on edges of the substrate. Signals generated by the photodetectors are processed to generate images of the objects. Reflective features are arranged in such a way that a line-of-sight propagation path exists between each reflective facet and a photodetector with no or little obstruction from the other reflective features for rays of reflected light normal to edges of the light guide substrate.

26 Claims, 7 Drawing Sheets

FACET SHAPE AND DISTRIBUTION PATTERN FOR LENSLESS IMAGING

FIELD

Embodiments of the present invention relate generally to a lensless imaging system. More particularly, embodiments of the invention relate to shapes and distribution patterns of reflective features in a lensless imaging system suitable for capturing touchless user gesture inputs.

BACKGROUND

A conventional touchscreen registers touch events when a user's finger or a physical object held by a user, such as a stylus, comes into contact with the surface of the touchscreen. Conventional touchscreens have many advantages and are becoming commonplace in computers, mobile devices, and other consumer electronic devices, etc. However, in some use environments, it may be desirable to have a touchless gesturing input system instead of a conventional touchscreen. A touchless gesturing input system is capable of capturing a user's hand gestures, hand movements, or the movements of a physical object held by a user, etc., without the user's hand or the physical object coming into contact with the touchless gesturing input system itself. With such a touchless gesturing input system, a user may interact with an electronic user interface by making specific hand gestures or movements, or by moving some physical object in a particular way. In some embodiments, a touchless gesturing input system may be integrated with a display device so that a user may intuitively manipulate elements of a user interface displayed on the display device by making hand gestures or other movements in front of the display device.

Some suitable lensless imaging systems for use as touchless gesturing input systems are known in the art. For example, such a lensless imaging system may be comprised of a substrate, an array of reflective features formed with a substantially even distribution on or in the substrate, and a plurality of photodetectors provided on the edges of the substrate. A suitable routine is also implemented with the lensless imaging system. When the lensless imaging system is in operation, incident ambient light from the front side of the substrate is reflected off of the reflective features toward the photodetectors. Then the routine processes the signals generated by the photodetectors to obtain a rough image of the object(s) in front of the lensless imaging system.

For example, the substrate of a lensless imaging system may be transparent and oblong rectangular, and is of the same length and width as or of slightly longer length and width than a regular flat screen display on which the lensless imaging system is superimposed. When a user moves a hand or an object in front of the lensless imaging system, successive corresponding images are generated by the lensless imaging system. Combined with proper software, such a combination of the lensless imaging system and the flat screen display allows a user to manipulate elements of a user interface displayed on the flat screen display by making hand gestures or movements, or by moving some other object, in front of the lensless imaging system.

Different shapes of the reflective features and/or distributions of such reflective features over a surface for receiving ambient light may be used in a lensless imaging system. The shape of the reflective features used may impact the quality of the images obtained, and therefore shapes of the reflective features that result in images of higher quality are desirable.

SUMMARY

Aspects of the invention are related to a method for capturing an image without a lens, comprising: receiving ambient light through a surface of a lensless imaging light guide substrate configured to reflect the ambient light toward an array of photodetectors with a plurality of reflective features, the reflective features each including at least one planar reflective facet; generating signals at the plurality of photodetectors based on the reflected light; and processing the signals to generate an image, wherein a line-of-sight propagation path exists between each reflective facet and a photodetector disposed on an edge of the light guide substrate without obstruction from the other reflective features for rays of reflected light normal to edges of the light guide substrate.

Aspects of the invention are related to an apparatus to capture an image without a lens, comprising: a plurality of reflective features of a light guide substrate to reflect light, each reflective feature having at least one planar facet; a plurality of photodetectors to generate signals based on the reflected light; and a processor to process the signals to generate an image, wherein a line-of-sight propagation path exists between each reflective facet and a photodetector disposed on an edge of the light guide substrate for rays of reflected light normal to edges of the light guide substrate.

Aspects of the invention are related to an apparatus for capturing an image without a lens, comprising: means for reflecting light received through a surface of a lensless imaging light guide substrate toward an array of photodetectors; means for generating signals based on the reflected light; and means for processing the signals to generate an image, wherein a line-of-sight propagation path exists between each reflective facet and the means for generating signals disposed on an edge of the light guide substrate for rays of reflected light normal to edges of the light guide substrate.

Aspects of the invention are related to a non-transitory computer-readable medium containing instructions which, when executed by a computer, cause the computer to: process signals generated by a plurality of photodetectors to generate an image, the signals generated being based on light reflected off of a plurality of reflective features of a light guide substrate, each reflective feature including a planar reflective facet, wherein a line-of-sight propagation path exists between each reflective facet and a photodetector disposed on an edge of the light guide substrate for rays of reflected light normal to edges of the light guide substrate.

DETAILED DESCRIPTION

The various embodiments will be described in detail with reference to the accompanying drawings. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "computing system or device" refers to any form of programmable computer device with a user interface, including but not limited to laptop and desktop computers, tablets, smartphones, televisions, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, or any data processing apparatus.

Figure 1:
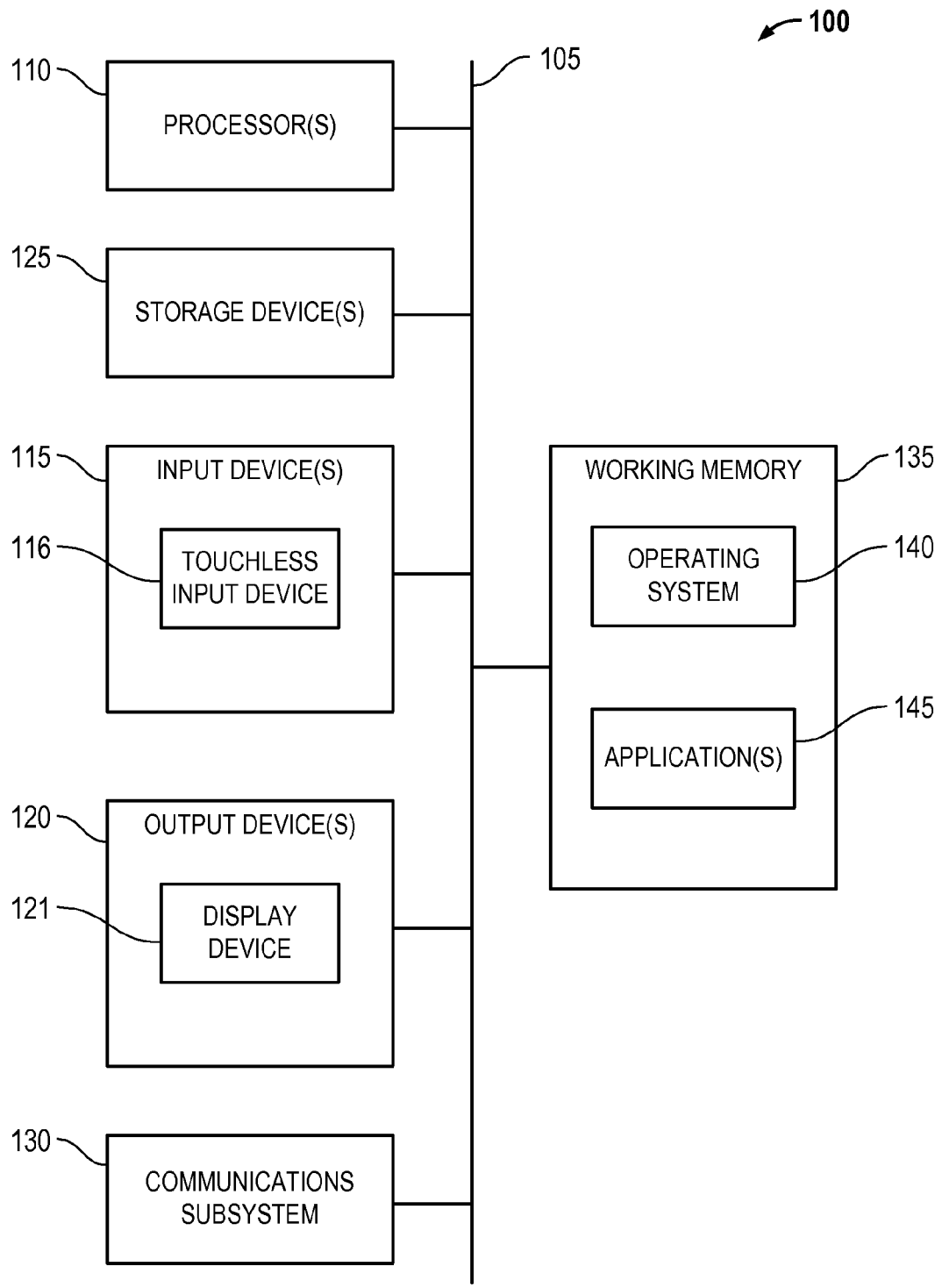
FIG. 1 illustrates an embodiment of a computer system adapted for a lensless imaging-based touchless gesturing input system.

An example computer system 100 adapted for a lensless imaging-based touchless gesturing input system is illustrated in FIG. 1. The computer system 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which include at least a lensless imaging-based touchless gesturing input device 116, and can further include without limitation a mouse, a keyboard, and/or the like; and one or more output devices 120, which include at least a display device 121, and can further include without limitation a speaker, a printer, and/or the like.

The computer system 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system may also include a communication subsystem 130, which can include without limitation a modem, a network card (wireless or wired), an infrared communication device, a wireless communication device and/or chipset (such as a Bluetooth device, an 802.11 device, a Wi-Fi device, a WiMax device, cellular communication devices, etc.), and/or the like. The communications subsystem 130 may permit data to be exchanged with a network, other computer systems, and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140, device drivers, executable libraries, and/or other code, such as one or more application programs 145, which may comprise or may be designed to implement methods, and/or configure systems, provided by other embodiments, as described herein. Merely by way of example, one or more procedures described with respect to the method(s) discussed below might be implemented as code and/or instructions executable by a computer (and/or a processor within a computer); in an aspect, then, such code and/or instructions can be used to configure and/or adapt a general purpose computer (or other device) to perform one or more operations in accordance with the described methods, according to embodiments of the invention.

A set of these instructions and/or code might be stored on a non-transitory computer-readable storage medium, such as the storage device(s) 125 described above. In some cases, the storage medium might be incorporated within a computer system, such as the system 100. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As previously described, lensless imaging systems that are suitable to be used as a touchless gesturing input system are known in the art. For example, a lensless imaging system may be comprised of a substrate, an array of reflective features formed with a substantially even distribution on or in the substrate, and a plurality of photodetectors provided on the edges of the substrate. The photodetector may be any kind of photodectors including Complementary Metal-Oxide-Semiconductor (CMOS) Active Pixel Sensors (APS), Charge-Coupled Devices (CCD), or photoresistors, etc. A suitable routine is also implemented with the lensless imaging system. When the lensless imaging system is in operation, incident ambient light from the front side of the substrate is reflected off of the reflective features toward the photodetectors. Then the routine processes the signals generated by the photodetectors to obtain a rough image of the object(s) in front of the lensless imaging system.

For example, the substrate of a lensless imaging system may be transparent and oblong rectangular, and is of the same length and width as or of slightly longer length and width than a regular flat screen display on which the lensless imaging system is superimposed. Because the reflective features of the lensless imaging system collectively occupy only a very small percentage (e.g., 3%) of the area of the substrate, the content displayed on the flat screen display may be perceived by a user through the lensless imaging system with minimal distortion or degredation. When a user moves a hand or an object in front of the lensless imaging system, successive corresponding images are generated by the lensless imaging system. Coupled with proper software, such a combination of the lensless imaging system and the flat screen display allows a user to manipulate elements of a user interface displayed on the flat screen display by making hand gestures or movements, or by moving some other object, in front of the lensless imaging system.

Figure 2:
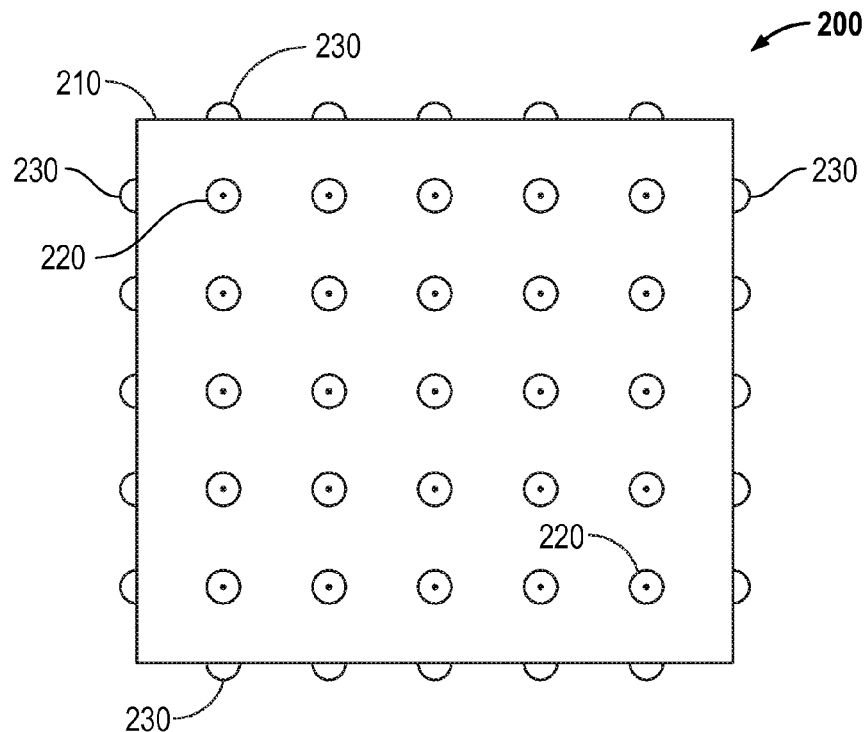
FIG. 2 illustrates a top view of a lensless imaging system.

FIG. 2 illustrates a top view of a known lensless imaging system 200. In this type of lensless imaging system 200, reflective features, such as feature 220, are rotationally symmetrical, for example cone-shaped, and are each in line with the others, while photodetectors, such as photodetector 230, are provided on the four edges of the rectangular substrate 210. The reflective features can include one or more planar reflective facets. With the configuration of the facets shown in FIG. 2, the image obtained may exhibit ghost effects and may only be partially accurate because light reflected off of a feature is obstructed or interfered with by other features before reaching the photodetector(s). Furthermore, cone-shaped, or other rotationally symmetrically shaped, reflective features can reflect light incident upon the reflective feature in a range of directions. For example, light scattered off of an object to be imaged, such as a finger or a hand, and incident on feature 220 includes light scattered from a small region of the object and hence such light over the small region is likely to be similar in light intensity and color. Light hitting one portion of the cone may be reflected in one direction, but light incident from another very close and similar portion of the object may strike another part of the cone and be reflected in another direction and towards another photodetector. Hence, if all of the light striking the surface area of the substrate 210 subtended by the feature 220 will be reflected in potentially all directions and will contribute some light intensity to many photodetector 230 cells.

Figure 3:
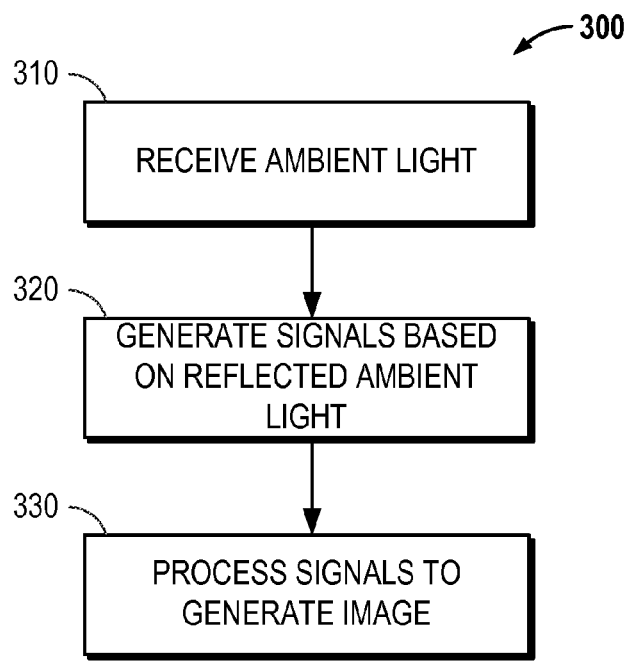
FIG. 3 is a flowchart illustrating an exemplary method for deriving an image with a lensless imaging system, according to one embodiment of the invention.

FIG. 3 is a flowchart illustrating an exemplary method 300 for deriving an image with a lensless imaging system, according to one embodiment of the invention. At operation 310, ambient light received through a surface of a light guide of a lensless imaging system is reflected off of an array of reflective features formed on or in the light guide of the lensless imaging system. The light guide can comprise a substrate with an index of refraction higher than an index of refraction of the surrounding material (for example, air or a low index coating). At operation 320, photodetectors placed on the edges of the substrate generate signals representing the reflected light reaching the photodetectors. At operation 330, a routine processes signals generated by the photodetectors and generates an image representing object(s) in front of the lensless imaging system. In the method 300, according to one embodiment of the invention, the light reflected off of one of the plurality of reflective features travels to at least one of the plurality of photodetectors with minimized obstruction and interference caused by the others of the plurality of reflective features. For example, the reflective features are configured such that one or more reflective features include at least one planar facet oriented relative to at least one photodetector such that a ray normal to an edge of the light guide substrate can strike a photodetector without obstruction by another feature. For example, the ray normal to an edge of the light guide substrate can provide a path from the reflective feature through the light guide to a photodetector without hitting another reflective feature. In one example, the plurality of planar reflective facets may form a plurality of pyramids and may be staggered.

As will be described, in this way, embodiments of the present invention improve the image quality of a lensless imaging system by optimizing shape and distribution of the reflective features of the lensless imaging system. In general, with the optimized shape and distribution of the reflective features disclosed herein, obstruction and interference of light reflected off of a reflective feature caused by another reflective feature before the light reaches a photodetector are minimized because either a clear and line-of-sight path, or a path very close to a clear and line-of-sight path, exists between each planar reflective facet of a reflective feature and a corresponding photodetector.

First Embodiment

Figure 4A:
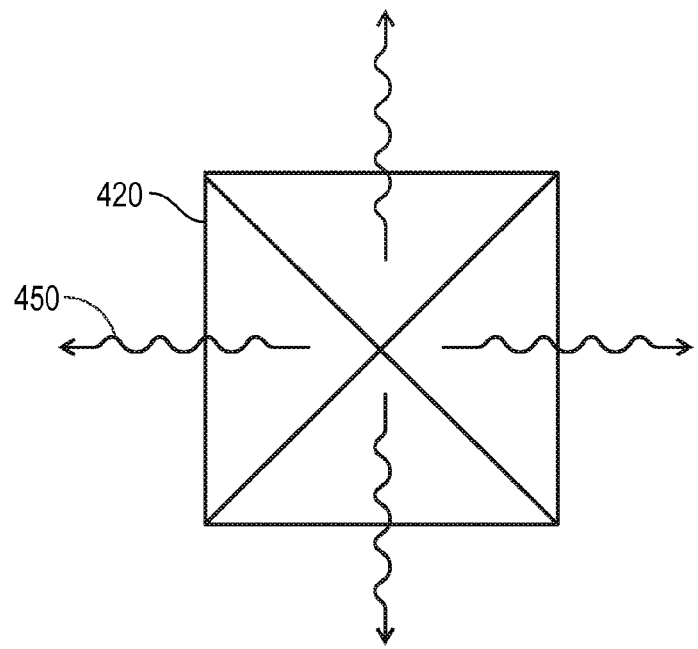
FIG. 4A illustrates a top view of four exemplary reflective features of an exemplary lensless imaging system.

FIG. 4A illustrates a top view of four exemplary reflective facets to form a square pyramid 420-shaped exemplary reflective feature that is used in an exemplary lensless imaging system 400 (FIG. 4C), to be hereinafter described. The four reflective facets forming a square pyramid 420, as well as four rays of reflected light, such as rays 450, are shown in FIG. 4A.

Figure 4B:
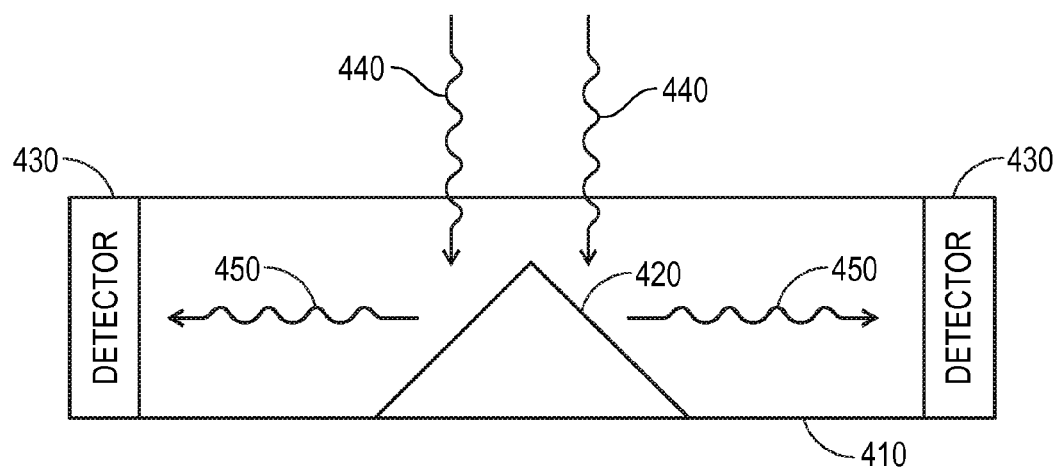
FIG. 4B illustrates a side view of a square pyramid formed by four planar facets of a reflective feature of an exemplary lensless imaging system.

FIG. 4B illustrates a side view of a square pyramid 420 formed by four exemplary reflective facets of the exemplary lensless imaging system 400. It should be recognized that FIG. 4B is illustrative in showing only one square pyramid between two opposing edges of the light guide substrate 410 and omitting other square pyramids likely visible also from the side. Photodetectors, such as photodetector 430, are provided on the edges of the substrate 410. In this embodiment, as can be seen in FIGS. 4A and 4B, the angle between the substrate 410 and each of the planar facets (each facet being a side of a square pyramid 420), is 45 degrees such that a ray of incident light that is perpendicular to a light-receiving surface of substrate 410, such as the ray 440, may be reflected off of one of the planar facets toward one of the edges of the rectangular substrate 410 with a zero angle of incidence, with the rays of reflected light, such as the ray 450, being parallel to the substrate 410, and to be received by a photodetector 430.

Figure 4C:
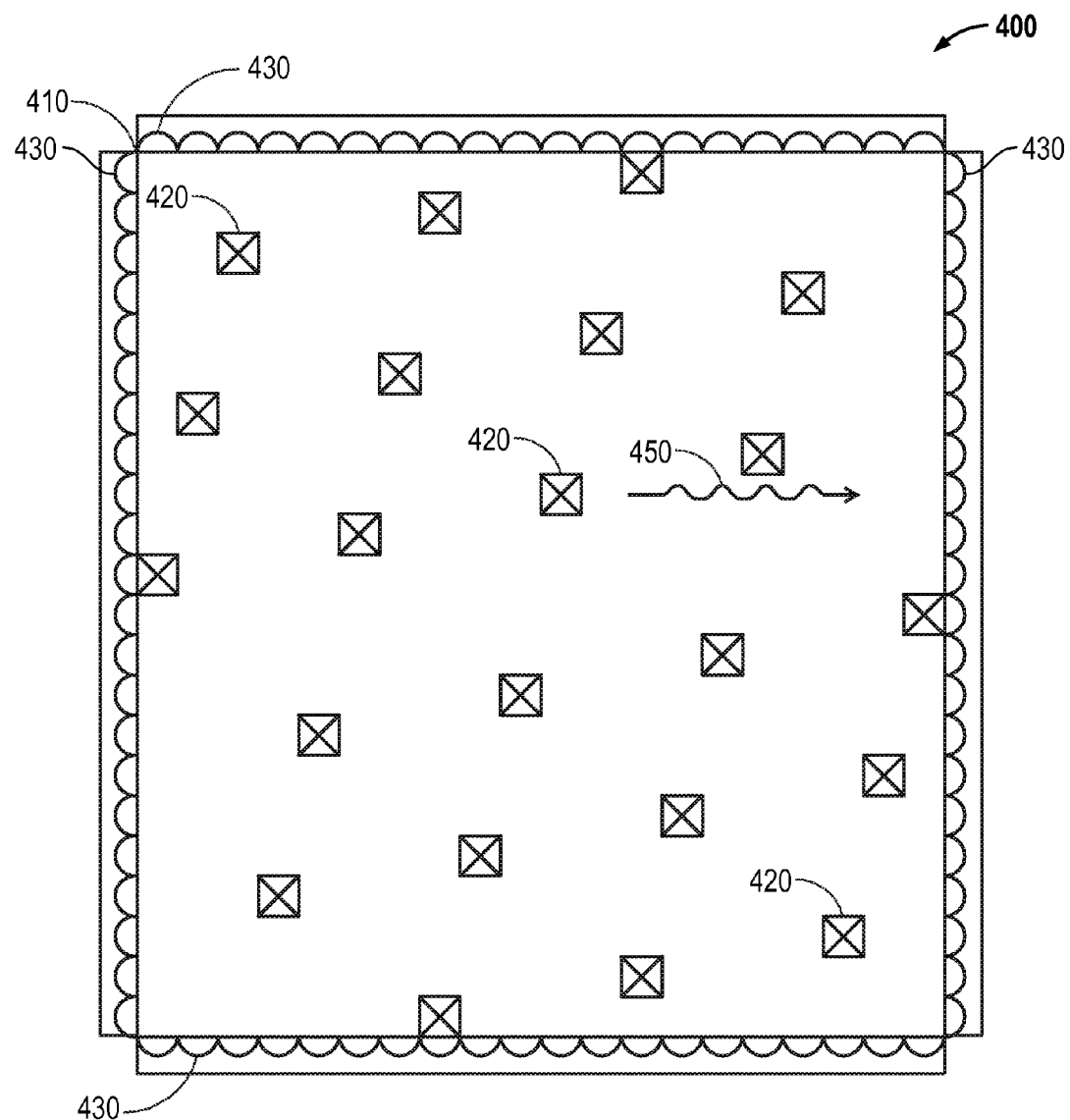
FIG. 4C illustrates a top view of an exemplary lensless imaging system.

FIG. 4C illustrates a top view of the exemplary lensless imaging system 400 according to one embodiment of the invention. FIG. 4C shows an exemplary distribution of the square pyramid 420-shaped reflective features including reflective facets. In this embodiment, square pyramids 420 are staggered to provide a clear and direct line-of-sight path between each of the planar facets, and one of the edges of the substrate 410. Because of the staggered distribution of reflective features, a ray of reflected light perpendicular to the light guide substrate edge, such as the ray 450, can reach a photodetector on the edge without obstruction or interference caused by any of the other reflective features.

In the embodiment shown in FIG. 4C, the square pyramids 420 all have the same width as the photodetectors, such as photodetector 430, and the width may be referred to as the unit length. The photodetectors 430 may be placed as close as possible, and the distance between two neighboring photodetectors may be negligible. One exemplary method for deriving the arrangement of reflective facets shown in FIG. 4C is described as follows. First, the square pyramids 420 are placed in a grid n units of length apart (for example, center to center). Each successive pyramid 420 is then shifted one unit to the right and one unit down. It should be appreciated that in this arrangement, no more than n+1 pyramids 420 may be placed in a single row or column. In the embodiment shown in FIG. 4C, n is equal to 5. It should also be appreciated that assuming that each facet produces 1 pixel in the image result, the resolution of the lensless imaging system 400 shown in FIG. 4C may be 88 pixels.

As an example, processor 110 of computer system 100 may process signals generated by the photodetectors 430 that are based on the light received through a surface of the lensless imaging system and reflected from the reflective facets of the square pyramid 420-shaped reflective feature to generate an image, wherein the light reflected off of one of the plurality of reflective facets of the reflective features travels to at least one of the plurality of photodetectors 430 with minimized obstruction and interference caused by the others of the plurality of reflective facets of the reflective features.

Second Embodiment

Figure 5:
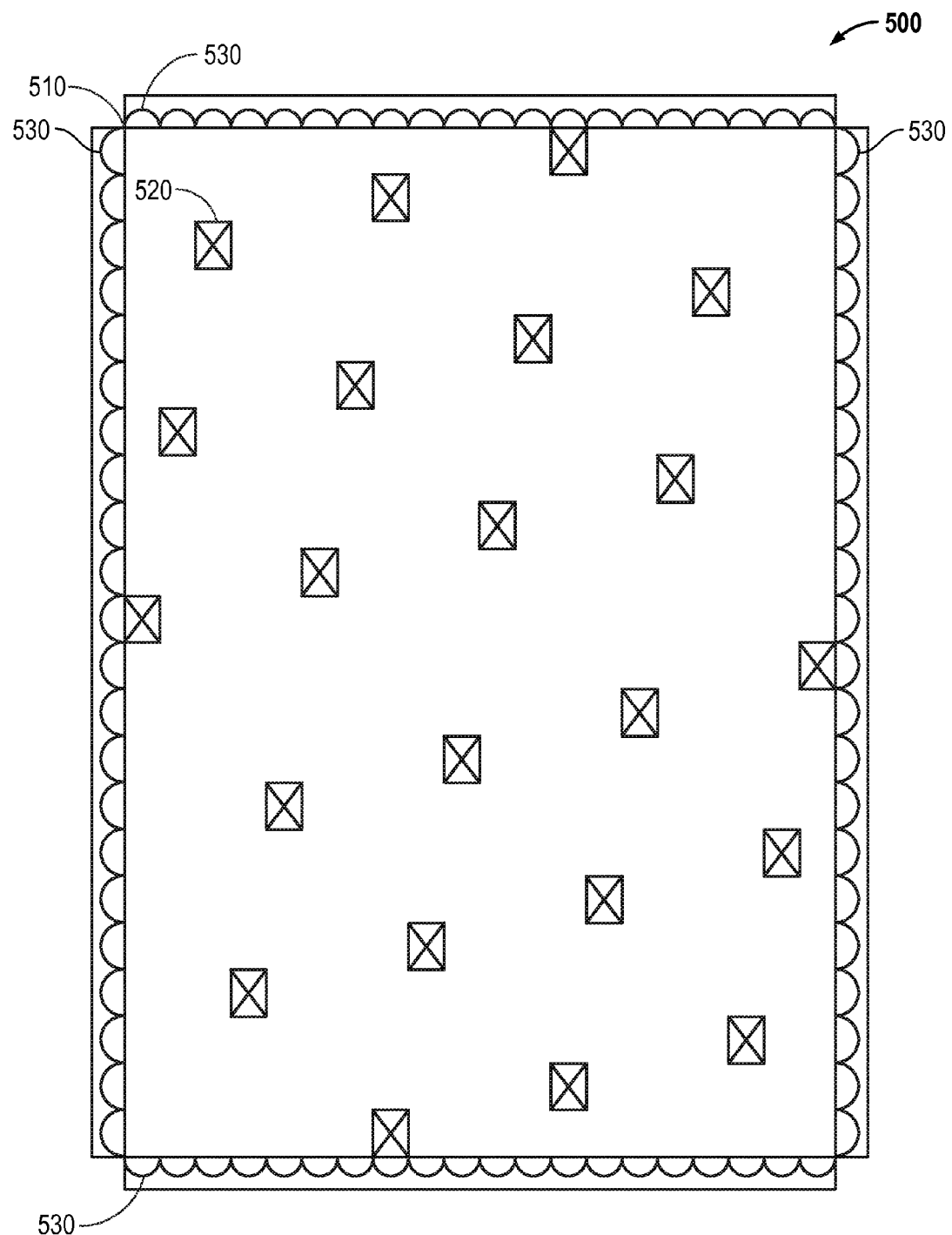
FIG. 5 illustrates a top view of an exemplary lensless imaging system.

FIG. 5 illustrates a top view of an exemplary lensless imaging system 500. The lensless imaging system 500 differs from the lensless imaging system 400 described above in that in the lensless imaging system 500, facets form pyramid 520-shaped reflective features where the pyramids have oblong rectangular bases instead of square bases. Facets forming square pyramid-shaped reflective features, such as the facets of the lensless imaging system 400, are easier to manufacture. However, due to the fact that most flat screen display devices are of an oblong rectangular shape, using facets forming square pyramids may result in dead rows and columns in a lensless imaging system, meaning some rows and columns are without a facet. Utilizing facets forming pyramids with oblong rectangular bases can eliminate dead rows and columns, as can be seen in the lensless imaging system 500 illustrated in FIG. 5. It should also be appreciated that assuming that each facet produces 1 pixel in the image result, the resolution of the lensless imaging system 500 shown in FIG. 5C may be 88 pixels.

Third Embodiment

Figure 6A:
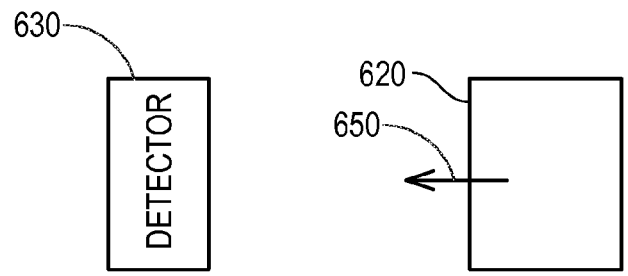
FIG. 6A illustrates a top view of an exemplary chisel-shaped reflective feature of an exemplary lensless imaging system.

FIG. 6A illustrates a top view of an exemplary chisel-shaped reflective facet 620 of an exemplary lensless imaging system. As shown in FIG. 6A, chisel-shaped reflective facet 620 has a rectangular shape when viewed from above. A photodetector 630 and a reflected ray of light 650 are also shown in FIG. 6A.

Figure 6B:
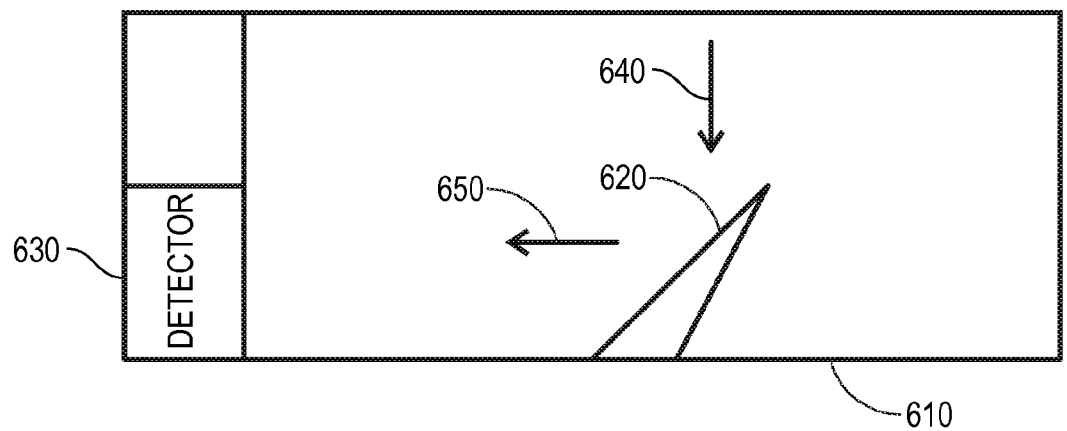
FIG. 6B illustrates a side view of an exemplary chisel-shaped reflective feature of an exemplary lensless imaging system.

FIG. 6B illustrates a side view of the exemplary chisel-shaped reflective feature 620 of the exemplary lensless imaging system 600. As shown in FIG. 6B, two sides of the chisel-shaped reflective feature 620 and the light guide substrate 610 of the lensless imaging system 600 form an obtuse triangle where the substrate 610 is one side of the obtuse angle. The angle between the reflective side of the feature 620 and the light guide substrate 610 is 45 degrees. A ray of incident light 640 that is perpendicular to the light receiving surface of the substrate 610 is reflected off of the reflective side of the feature 620 as a ray of reflected light 650. Because of the angle of the reflective side of the feature 620, the ray of reflected light 650 heads toward the photodetector 630 placed on one edge of the substrate 610 with a zero angle of incidence. Moreover, the ray of reflected light 650 is parallel to the substrate 610.

It should be appreciated that there are several benefits to chisel-shaped reflective features. First, if photodetectors are placed on fewer than all four edges of a rectangular substrate, no reflective facet is wasted with chisel-shaped reflective features. Second, because the reflective side of a chisel-shaped feature is far larger than the profile of a chisel-shaped feature, a chisel-shaped feature causes little obstruction or interference to light reflected off of another chisel-shaped feature placed perpendicular to it even if it is on the path of the light. In other words, chisel-shaped features placed in perpendicular directions need not be reconciled with each other.

Figure 6C:
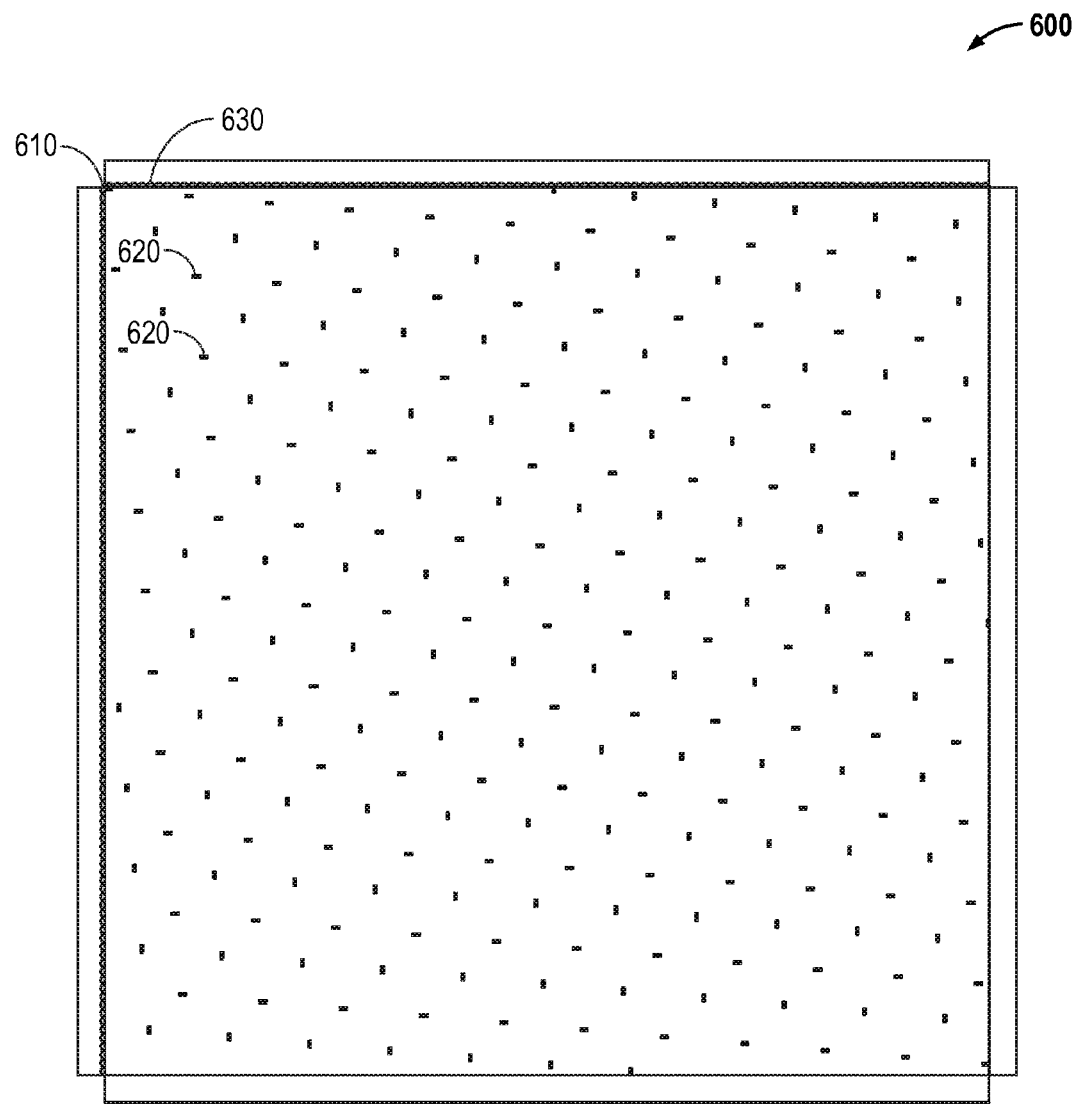
FIG. 6C illustrates a top view of an exemplary lensless imaging system.

FIG. 6C illustrates a top view of the exemplary lensless imaging system 600. FIG. 6C shows an exemplary distribution of chisel-shaped reflective features, such as feature 620. In this embodiment, rows of photodetectors, such as the photodetector 630, are placed only on the top edge and the left edge of the substrate 610. Two groups of chisel-shaped features placed perpendicular to each other are provided: one group faces a first row of photodetectors; the other faces a second row of photodetetors. For the reason stated above, the two groups need not be reconciled with each other in their placement. Within each group, however, chisel-shaped features placed in the same direction are staggered so that they do not interfere with or obstruct light reflected off of each other. Because of the staggered distribution of the chisel-shaped features of the same group, a ray of reflected light perpendicular to the edge of substrate 610 it is heading toward, such as the ray 650, can reach a photodetector on the edge with minimal obstruction or interference caused by any of the other reflective features.

It should be appreciated that the exemplary method for arranging square pyramid-shaped features, as disclosed above, is equally applicable to arranging chisel-shaped features placed in the same direction. In the embodiment shown in FIG. 6C, n is equal to 10. It should also be appreciated that assuming that each chisel-shaped feature produces 1 pixel in the image result, the resolution of the lensless imaging system 600 shown in FIG. 6C may be 242 pixels.

By utilizing shapes and distribution patterns of reflective features of a lensless imaging system disclosed in detail herein with reference to FIGS. 4-6, as well as other shapes and distribution patterns that may be derived from the examples disclosed herein without deviating from the scope and spirit of the present disclosure, obstruction and interference of light reflected off of a reflective feature caused by the other reflective features are minimized, thereby improving the quality of the image generated by the lensless imaging system.

It should be appreciated that aspects of the invention previously described may be implemented in conjunction with the execution of instructions (e.g., applications) by processor 110 of computing device 100, as previously described. Particularly, circuitry of the device, including but not limited to processor, may operate under the control of an application, program, routine, or the execution of instructions to execute methods or processes in accordance with embodiments of the invention (e.g., the processes and implementations of FIGS. 3-6). For example, such a program may be implemented in firmware or software (e.g., stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a tangible non-transitory computer-readable medium or processor-readable medium. Non-transitory computer-readable and processor-readable media may be any available media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for capturing an image without a lens, comprising:
   receiving ambient light through a surface of a lensless imaging light guide substrate configured to reflect the ambient light toward an array of photodetectors with a plurality of reflective features, the reflective features each including at least one planar reflective facet;
   generating signals at the plurality of photodetectors based on the reflected light; and
   processing the signals to generate an image, wherein a line-of-sight propagation path exists between each reflective facet and a photodetector disposed on an edge of the light guide substrate without obstruction from the other reflective features for rays of reflected light normal to edges of the light guide substrate, wherein the plurality of reflective features are staggered, and wherein any two neighboring reflective features do not occupy a same row or column in a grid of rows and columns.

2. The method of claim 1, wherein at least some of the plurality of reflective features are pyramid-shaped, and each of the pyramid-shaped reflective features includes a base of a shape selected from a group consisting of a square and an oblong rectangle.

3. The method of claim 1, wherein at least some of the plurality of reflective features are chisel-shaped.

4. The method of claim 3, wherein the plurality of chisel-shaped reflective features belong to two groups placed perpendicular to each other.

5. The method of claim 1, wherein the light guide substrate is rectangular and the plurality of photodetectors are placed on either two sides or all sides of the rectangular substrate.

6. An apparatus to capture an image without a lens, comprising:
   a plurality of reflective features of a light guide substrate to reflect light, each reflective feature having at least one planar facet;
   a plurality of photodetectors to generate signals based on the reflected light; and
   a processor to process the signals to generate an image, wherein a line-of-sight propagation path exists between each reflective facet and a photodetector disposed on an edge of the light guide substrate for rays of reflected light normal to edges of the light guide substrate, wherein the plurality of reflective features are staggered, and wherein any two neighboring reflective features do not occupy a same row or column in a grid of rows and columns.

7. The apparatus of claim 6, wherein at least some of the plurality of reflective features are pyramid-shaped.

8. The apparatus of claim 7, wherein each of the pyramid-shaped reflective features includes a square base.

9. The apparatus of claim 7, wherein each of the pyramid-shaped reflective features includes an oblong rectangular base.

10. The apparatus of claim 6, wherein at least some of the plurality of reflective features are chisel-shaped.

11. The apparatus of claim 10, wherein the plurality of chisel-shaped reflective features belong to two groups placed perpendicular to each other.

12. The apparatus of claim 6, wherein an angle between the substrate and at least one reflective facet of each of the plurality of reflective features is approximately 45 degrees.

13. The apparatus of claim 6, wherein the light guide substrate is rectangular and the plurality of photodetectors are placed on all sides of the rectangular substrate.

14. The apparatus of claim 6, wherein the light guide substrate is rectangular and the plurality of photodetectors are placed on two sides of the rectangular substrate.

15. An apparatus for capturing an image without a lens, comprising:
    means for reflecting light received through a surface of a lensless imaging light guide substrate toward an array of photodetectors; and
    means for generating signals based on the reflected light, wherein a line-of-sight propagation path exists between each reflective facet and the means for generating signals disposed on an edge of the light guide substrate for rays of reflected light normal to edges of the light guide substrate, wherein the means for reflecting light include a plurality of staggered reflective features, and wherein any two neighboring reflective features do not occupy a same row or column in a grid of rows and columns.

16. The apparatus of claim 15, wherein the plurality of reflective features are pyramid-shaped, and each of the plurality of pyramid-shaped reflective features includes a base of a shape selected from a group consisting of a square and an oblong rectangle.

17. The apparatus of claim 15, wherein the plurality of reflective features are chisel-shaped.

18. The apparatus of claim 17, wherein the plurality of chisel-shaped reflective features belong to two groups placed perpendicular to each other.

19. The apparatus of claim 15, wherein an angle between the substrate and at least one reflective facet of each of the plurality of reflective features is approximately 45 degrees.

20. The apparatus of claim 15, wherein the light guide substrate is rectangular and the plurality of photodetectors are placed on either two sides or all sides of the rectangular substrate.

21. A non-transitory computer-readable medium containing instructions which, when executed by a computer, cause the computer to:
    process signals generated by a plurality of photodetectors to generate an image, the signals generated being based on light reflected off of a plurality of reflective features of a light guide substrate, each reflective feature including a planar reflective facet,
    wherein a line-of-sight propagation path exists between each reflective facet and a photodetector disposed on an edge of the light guide substrate for rays of reflected light normal to edges of the light guide substrate, wherein the plurality of reflective features are staggered and wherein any two neighboring reflective features do not occupy a same row or column in a grid of rows and columns.

22. The non-transitory computer-readable medium of claim 21, wherein the plurality of reflective features are pyramid-shaped, and each of the plurality of pyramid-shaped reflective features includes a base of a shape selected from a group consisting of a square and an oblong rectangle.

23. The non-transitory computer-readable medium of claim 21, wherein the plurality of reflective features are chisel-shaped.

24. The non-transitory computer-readable medium of claim 23, wherein the plurality of chisel-shaped reflective features belong to two groups placed perpendicular to each other.

25. The non-transitory computer-readable medium of claim 21, wherein an angle between the substrate and at least one reflective facet of each of the plurality of reflective features is approximately 45 degrees.

26. The non-transitory computer-readable medium of claim 21, wherein the light guide substrate is rectangular and the plurality of photodetectors are placed on either two sides or all sides of the rectangular substrate.

* * * * *